United States Patent
Kurokawa

(10) Patent No.: US 8,836,821 B2
(45) Date of Patent: Sep. 16, 2014

(54) ELECTRONIC CAMERA

(75) Inventor: Mitsuaki Kurokawa, Osaka (JP)

(73) Assignee: SANYO Electric Co., Ltd., Moriguchi-shi (JP)

( * ) Notice: Subject to any disclaimer, the term of this patent is extended or adjusted under 35 U.S.C. 154(b) by 352 days.

(21) Appl. No.: 12/639,545

(22) Filed: Dec. 16, 2009

(65) Prior Publication Data
US 2010/0157102 A1 Jun. 24, 2010

(30) Foreign Application Priority Data
Dec. 24, 2008 (JP) .................. 2008-326892

(51) Int. Cl.
*H04N 5/262* (2006.01)
*H04N 5/232* (2006.01)

(52) U.S. Cl.
CPC ........... *H04N 5/232* (2013.01); *H04N 5/23296* (2013.01)
USPC ...................................................... 348/240.1

(58) Field of Classification Search
CPC .. H04N 5/23296; H04N 5/2628; H04N 5/232
USPC .............. 348/208.99, 208.4, 208.6, 208.12, 348/220.1, 221.1, 240.99, 240.1, 240.2, 348/240.3, 335, 345, 347, 364
See application file for complete search history.

(56) References Cited

U.S. PATENT DOCUMENTS 5,990,947 A 11/1999 Okino et al.
6,166,770 A * 12/2000 Yasuda ................... 348/350
6,489,993 B1 * 12/2002 Sato et al. ............... 348/240.3

(Continued)

FOREIGN PATENT DOCUMENTS

EP 1641247 A2 3/2006
JP 05-191701 A 7/1993

(Continued)

OTHER PUBLICATIONS

European Office Action dated Jun. 8, 2011, issued in corresponding European Patent Application No. 09015724.9.

(Continued)

*Primary Examiner* — Lin Ye
*Assistant Examiner* — Chriss Yoder, III
(74) *Attorney, Agent, or Firm* — Westerman, Hattori, Daniels & Adrian, LLP

(57) ABSTRACT

An electronic camera includes an image sensor. The image sensor has an imaging surface capturing an object scene through a zoom lens, and outputs an image representing the object scene. The image outputted from the image sensor is reduced in size by a zoom circuit arranged in a pre-processing circuit. A post-processing circuit extracts a reduced image belonging to an extraction area of a predetermined size, out of the reduced image created by the pre-processing circuit. Depending on a change of a magnification of the zoom lens, a CPU changes a size of the reduced image created by the pre-processing circuit in the same direction as a change direction of the magnification of the zoom lens. An angle of view of the reduced image extracted by the post-processing circuit decreases by a rate exceeding a decrease rate resulting from an increase in optical zoom magnification.

11 Claims, 17 Drawing Sheets

(56) References Cited

U.S. PATENT DOCUMENTS

| | | | |
|---|---|---|---|
| 6,765,616 B1* | 7/2004 | Nakano et al. | 348/322 |
| 7,409,151 B2 | 8/2008 | Kato et al. | |
| 7,688,364 B2* | 3/2010 | LeGall et al. | 348/240.99 |
| 7,773,129 B2* | 8/2010 | Ueda et al. | 348/240.3 |
| 7,936,383 B2* | 5/2011 | Yamamoto et al. | 348/240.1 |
| 8,040,399 B2* | 10/2011 | Georgis et al. | 348/240.1 |
| 8,045,047 B2* | 10/2011 | Nikkanen et al. | 348/350 |
| 2004/0095485 A1 | 5/2004 | Ueda et al. | |
| 2004/0196389 A1* | 10/2004 | Honda | 348/231.7 |
| 2006/0062558 A1 | 3/2006 | Kato et al. | |
| 2007/0025714 A1 | 2/2007 | Shiraki | |
| 2007/0053068 A1* | 3/2007 | Yamamoto et al. | 359/676 |
| 2009/0167897 A1* | 7/2009 | Fujita | 348/240.1 |
| 2009/0167899 A1* | 7/2009 | Tsuda | 348/240.2 |
| 2009/0213231 A1 | 8/2009 | Kurokawa | |

FOREIGN PATENT DOCUMENTS

| | | |
|---|---|---|
| JP | 2005-117283 A | 4/2005 |
| JP | 2006-094031 A | 4/2006 |
| JP | 2007-028283 A | 2/2007 |
| JP | 2007-166551 A | 6/2007 |

OTHER PUBLICATIONS

European Search Report dated Apr. 6, 2010, issued in corresponding European Patent Application No. 09015724.9.

Summons to attend oral proceedings pursuant to rule 115(1) EPC date Feb. 14, 2012, issued in corresponding European Patent Application No. 09015724.9.

Notification of Reasons of Refusal dated Oct. 9, 2012 issued in corresponding Japanese Patent Application No. 2008-326892.

* cited by examiner (A) SENSOR-OUTPUT-IMAGE (B) EIS/AF EVALUATION IMAGE (C) AE/AWB EVALUATION IMAGE (A) SENSOR-OUTPUT-IMAGE
(OPTICAL ZOOM=1.0)

H*V=3072*1728

(C) EIS/AF EVALUATION IMAGE
(RAWZOOM=0.625)

MD1-
MD9

H*V=1536*864
FA (B) PRE-PROCESSING IMAGE
(RAWZOOM=0.625)

H*V=1920*1080

(D) AE/AWB EVALUATION IMAGE
(RAWZOOM=0.625)

EWA

H*V=
768*1728

(A) SENSOR-OUTPUT-IMAGE
(OPTICAL ZOOM=5.0)

H*V=3072*1728

(C) EIS/AF EVALUATION IMAGE
(RAWZOOM=0.7692)

MD1~MD9

H*V=1536*864

FA(H*V=1258*697)

(B) PRE-PROCESSING IMAGE
(RAWZOOM=0.7692)

EX

H*V=2363*1329

(D) AE/AWB EVALUATION IMAGE
(RAWZOOM=0.7692)

EWA(H*V=590*1329)

H*V=768*1728

(A) SENSOR-OUTPUT-IMAGE
(OPTICAL ZOOM=10.0)

(B) PRE-PROCESSING IMAGE
(RAWZOOM=1.0)

(C) EIS/AF EVALUATION IMAGE
(RAWZOOM=1.0)

(D) AE/AWB EVALUATION IMAGE
(RAWZOOM=1.0)

ELECTRONIC CAMERA

CROSS REFERENCE OF RELATED APPLICATION

The disclosure of Japanese Patent Application No. 2008-326892, which was filed on Dec. 24, 2008, is incorporated herein by reference.

BACKGROUND OF THE INVENTION

1. Field of the Invention

The present invention relates to an electronic camera. In particular, the present invention relates to an electronic camera which performs a reducing process on an object scene image outputted from an image sensor.

2. Description of the Related Art

According to one example of this type of camera, a scaling parameter corresponding to an electronic zoom magnification instructed by a zoom key is set to a RAW data-use scaling circuit. The RAW data-use scaling circuit performs a scaling process according to the scaling parameter on the image data outputted from an A/D converter. RAW data outputted from the scaling process circuit is recorded on a recording medium in a compressed state.

However, in the above-described camera, the magnification of a zoom lens is not referred to when the scaling parameter is set, and thus, a performance of reproducing an object scene image is limited.

SUMMARY OF THE INVENTION

An electronic camera according to the present invention, comprises: an imager, having an imaging surface capturing an object scene through a zoom lens, which outputs an image representing the object scene; a reducer which reduces the image outputted from the imager; an extractor which extracts a reduced image belonging to an extraction area of a predetermined size, out of the reduced image created by the reducer; and a controller which changes, in association with a change of a magnification of the zoom lens, a size of the reduced image created by the reducer in the same direction as a change direction of the magnification of the zoom lens.

Preferably, further comprised is a changer which changes a position of the extraction area so that a motion of the imaging surface in a direction orthogonal to an optical axis is compensated, wherein the imager repeatedly produces the image.

Preferably, the controller adjusts the size of the reduced size to the predetermined size corresponding to a wide end of the zoom lens.

Preferably, the controller adjusts the size of the reduced image to a maximum size corresponding to a tele end of the zoom lens.

Preferably, the controller adjusts the size of the reduced image to a size smaller than a maximum size corresponding to a tele end of the zoom lens.

Preferably, the maximum size of the reduced image is equivalent to a size of the image outputted from the imager.

Preferably, the controller alternately executes a processing operation for changing a size of the reducer and a processing operation for changing a magnification of the zoom lens.

Preferably, the controller simultaneously executes a processing operation for changing a size of the reducer and a processing operation for changing a magnification of the zoom lens.

More preferably, further comprised are: a moving-image recorder which executes a moving-image recording process in response to a moving-image recording manipulation; and a still-image recorder which executes a still-image recording process in response to a still-image-recording manipulation.

More preferably, further comprised is an adjustor which adjusts an imaging parameter based on an image that is before being reduced by the reducer.

More preferably, the image outputted from the imager is equivalent to an image in which each pixel has color information of any one of a plurality of colors, the electronic camera further comprising a converter which converts the reduced image extracted by the extractor into an image in which each pixel has color information of all the plurality of colors.

The above described features and advantages of the present invention will become more apparent from the following detailed description of the embodiment when taken in conjunction with the accompanying drawings.

DETAILED DESCRIPTION OF THE PREFERRED EMBODIMENTS

Figure 1:
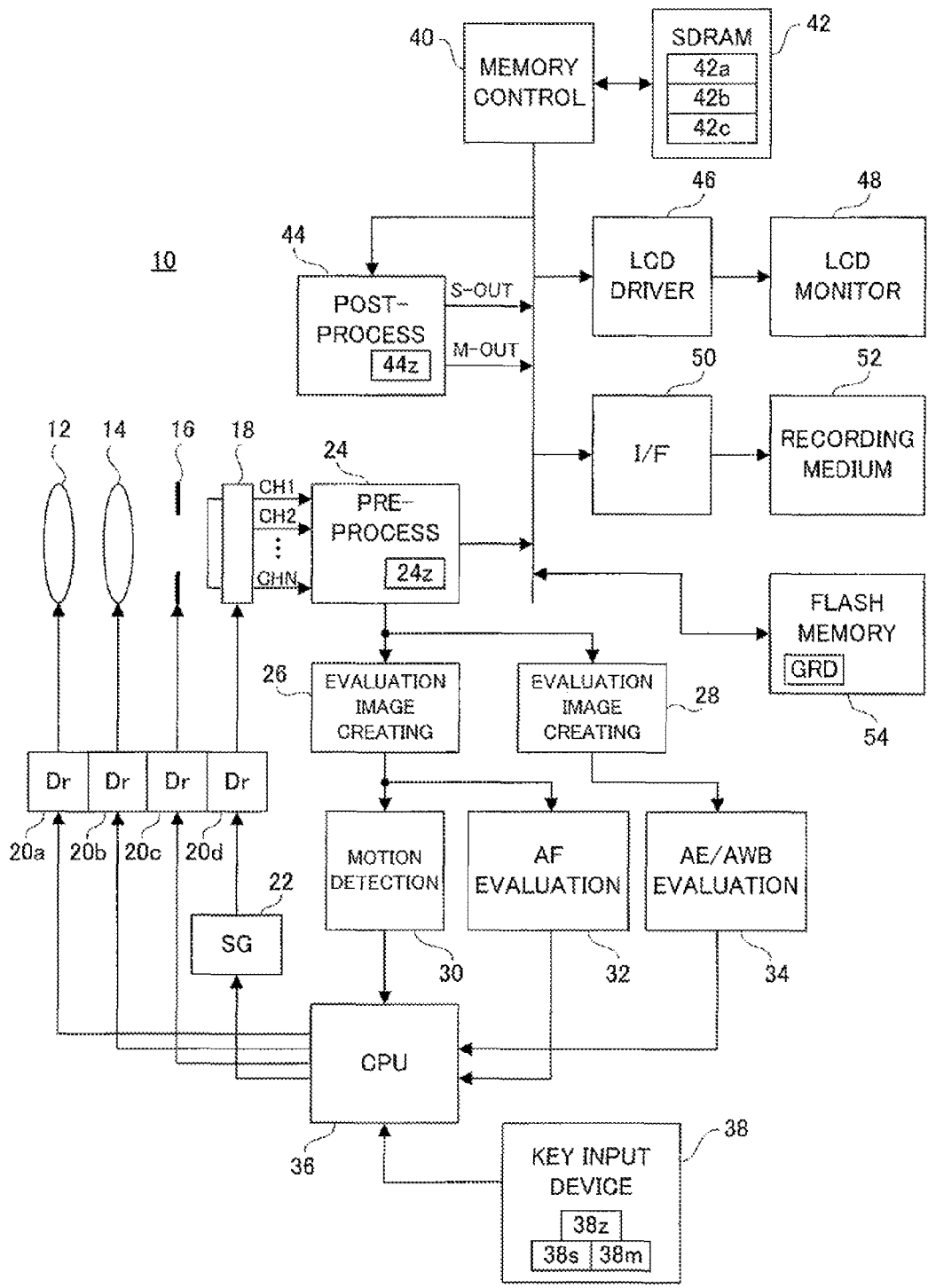
FIG. 1 is a block diagram showing a configuration of one embodiment of the present invention.

With reference to FIG. 1, a digital camera 10 according to this embodiment includes a zoom lens 12, a focus lens 14, and an aperture unit 16 driven by drivers 20a, 20b, and 20c, respectively. An optical image of an object scene is irradiated onto an imaging surface of a CMOS-type image sensor 18 through these members. The imaging surface has an effective pixel area equivalent to horizontal 3072 pixels×vertical 1728 pixels, and is covered with a primary color filter (not shown) having a Bayer array. Electric charges produced in each pixel have any one of color information, i.e., R (Red), G (Green), and B (Blue).

Figure 2:
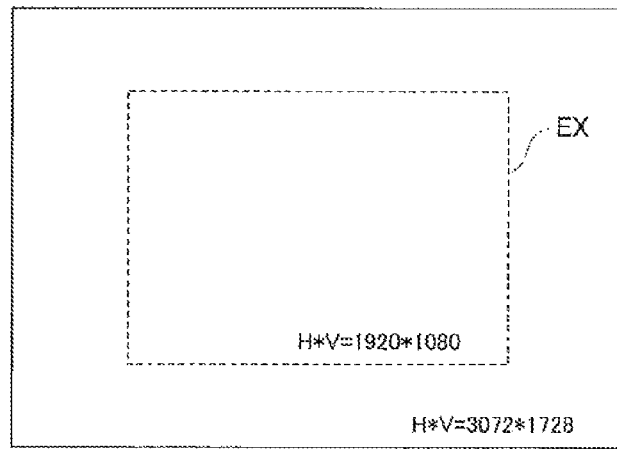
FIG. 2(A) is an illustrative view showing one example of a resolution of an image outputted from an image sensor.
FIG. 2(B) is an illustrative view showing one example of a resolution of an EIS/AF evaluation image.
FIG. 2(C) is an illustrative view showing one example of a resolution of an AE/AWB evaluation image.
Figure 2:
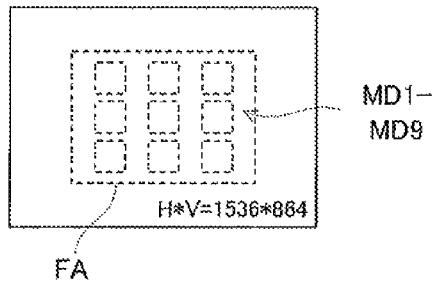
Figure 2:
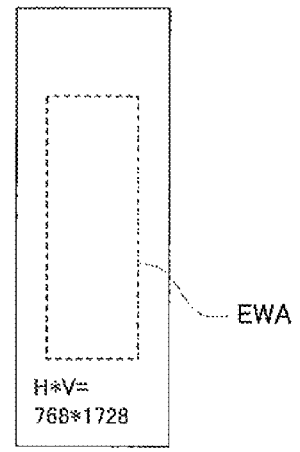

When a power supply is inputted, a CPU 36 applies a corresponding command to a driver 20d in order to execute a through-image process. The driver 20d exposes the imaging surface in response to a vertical synchronization signal Vsync generated for each 1/30 seconds from an SG (Signal Generator) 22, and reads out the electric charges produced thereby from the imaging surface. The image sensor 18 has N (N: an integer of equal to or more than 2, e.g., "4") of channels CH1 to CHN. Raw image data based on the read-out electric charges are outputted dispersively (in parallel) from the channels CH1 to CHN. The outputted raw image data has a resolution of horizontal 3072 pixels×vertical 1728 pixels, as shown in FIG. 2(A).

A pre-processing circuit 24 respectively performs pre-processes of parallel N systems on N channels of raw image data outputted from the image sensor 18. The pre-process of each system is configured by a noise removal, a reduction zoom, and an edge adjustment, and the raw image data that has undergone such a pre-process is written into a raw image area 42a of an SDRAM 42 through a memory control circuit 40.

It is noted that the reduction zoom in the pre-processing circuit 24 is executed by a zoom circuit 24z. Below, the reduction zoom executed by the zoom circuit 24z is defined as "RAW zoom".

The raw image data (resolution: horizontal 3072 pixels× vertical 1728 pixels) from which the noise is removed by the pre-processing circuit 24 is also applied to evaluation-image creating circuits 26 and 28. The evaluation-image creating circuit 26 performs an adding process (vertical two pixels) and an adding process (horizontal two pixels) on the applied raw image data so as to create EIS/AF evaluation image data. On the other hand, the evaluation-image creating circuit 28 performs an adding process (horizontal four pixels) on the applied raw image data so as to create AE/AWB evaluation image data.

The EIS/AF evaluation image data has a resolution of horizontal 1536 pixels×vertical 864 pixels, as shown in FIG. 2(B). The AF/AWB evaluation image data has a resolution of horizontal 768 pixels×vertical 1728 pixels, as shown in FIG. 2(C). The EIS/AF evaluation image data is applied to a motion detecting circuit 30 and an AF evaluating circuit 32, and the AE/AWB evaluation image data is applied to an AE/AWB evaluating circuit 34.

With reference to FIG. 2(A) and FIG. 2(B), one extraction area EX and nine motion detection areas MD1 to MD9 are allocated to the imaging surface. The extraction area EX has a size equivalent to horizontal 1920 pixels×vertical 1080 pixels. Furthermore, the motion detection areas MD1 to MD3 are lined up in a horizontal direction at an upper level of the imaging surface, the motion detection areas MD4 to MD6 are lined up in a horizontal direction at a middle level of the imaging surface, and the motion detection areas MD7 to MD9 are lined up in a horizontal direction at a lower level of the imaging surface.

The motion detecting circuit 30 detects a partial motion vector representing motion of the object scene in each of the motion detection areas MD1 to MD9 based on the EIS/AF evaluation image data, and combines together the detected partial motion vectors so as to create a total motion vector. Both the detecting process of the partial motion vectors and the creating process of the total motion vector are executed at each generation of the vertical synchronization signal Vsync.

Based on the total motion vector outputted from the motion detecting circuit 30, the CPU 36 determines which one of a camera shake and a pan/tilt operation causes the motion of the imaging surface in a direction orthogonal to an optical axis. When the motion of the imaging surface is caused due to the camera shake, the CPU 36 moves the extraction area EX along the total motion vector. A position of the extraction area EX is changed so that the motion of the imaging surface caused due to the camera shake is compensated (offset).

A post-processing circuit 44 reads out the partial raw image data belonging to the extraction area EX, out of the raw image data accommodated in the raw image area 42a, through the memory control circuit 40, and performs post-processes, such as a color separation, a white balance adjustment, a YUV conversion, and an enlargement zoom, on the read-out partial raw image data. The partial raw image data is read out from the raw image area 42a in response to the vertical synchronization signal Vsync, and the post-process is executed also in response to the vertical synchronization signal Vsync. The thus-produced image data of a YUV format is outputted from a moving-image output terminal M_OUT, and written into a moving image area 42b of the SDRAM 42 through the memory control circuit 40.

It is noted that each of a plurality of pixels forming the image data on which the color separation process is performed has all color information of R, G, and B. The format of such image data is converted to a YUV format by the YUV conversion, and the enlargement zoom is further performed thereon. In addition, the enlargement zoom in the post-processing circuit 44 is executed by the zoom circuit 44z. Below, the enlargement zoom executed by the post-processing circuit 44 is defined as "YUV zoom".

An LCD driver 46 repeatedly reads out the image data accommodated in the moving image area 42b, and drives an LCD monitor 48 based on the read-out image data. As a result, a real-time moving image (through image) representing the object scene is displayed on a monitor screen.

The AE/AWB evaluating circuit 34 integrates one portion of the AE/AWB evaluation image data belonging to a photometric/white balance area EWA shown in FIG. 2(C), out of the AE/AWB evaluation image data outputted from the evaluation-image creating circuit 28, at each generation of the vertical synchronization signal Vsync, and outputs an integral value, i.e., an AE/AWB evaluation value. The CPU 36 executes an AE/AWB process in order to calculate an appropriate EV value and an appropriate white balance adjustment gain based on the AE/AWB evaluation value outputted from the AE/AWB evaluating circuit 34. An aperture amount and an exposure time period that define the calculated appropriate EV value are set to the drivers 20c and 20d, respectively, and the calculated appropriate white balance adjustment gain is set to the post-processing circuit 44. As a result, a brightness and a white balance of the moving image outputted from the LCD monitor 48 are moderately adjusted.

The AF evaluating circuit 32 extracts one portion of the EIS/AF evaluation image data belonging to a focus area FA shown in FIG. 2(B), out of the EIS/AF evaluation image data outputted from the evaluation-image creating circuit 26, and integrates a high-frequency component of the extracted EIS/AF evaluation image data in response to the vertical synchronization signal Vsync. The calculated integral value, i.e., the AF evaluation value, is applied to the CPU 36 for a continuous AF process. The CPU 36 refers to the applied AF evaluation value so as to continually search a focal point by a so-called hill-climbing process. The focus lens 14 is placed at the discovered focal point.

When the zoom button 38z on the key input device 38 is manipulated, the CPU 36 sets, as a target display magnification, a display magnification different from that at a current time point by a predetermined amount (minute amount) in a desired direction, and calculates an optical zoom magnification, a RAW zoom magnification, and a YUV zoom magnification, corresponding to the set target display magnification.

Subsequent thereto, the CPU 36 sets the calculated optical zoom magnification, RAW zoom magnification, and YUV zoom magnification, to the driver 20a, the zoom circuit 24z, and the zoom circuit 44z, respectively, in order to execute the zoom process. Thereby, a through image having the target display magnification is outputted from the LCD monitor 48.

Thereafter, the CPU 36 changes settings of the motion detection areas MD1 to MD9, the focus area FA, and the photometric/white balance area EWA in order to enable adaptation to the RAW zoom magnification set to the zoom circuit 24z. This improves the accuracy of the image-stabilizing process, the continuous AF process, and the AE/AWB process.

When a movie button 38m on the key input device 38 is manipulated, the CPU 36 applies a recording start command to an I/F 50 in order to start a moving-image recording process. The I/F 50 creates a moving image file within the recording medium 52, cyclically reads out the image data accommodated in the moving image area 42b, and writes the read-out image data into the moving image file within the recording medium 52. When the movie button 38m is manipulated again, a recording stop command is applied to the I/F 50. The I/F 50 ends reading-out of the image data from the moving image area 42b, and closes the moving image file of a write destination. Thereby, the moving image file is completed.

When the shutter button 38s on the key input device 38 is manipulated while the moving-image recording process is being executed, the CPU 36 applies a still-image extracting command to the post-processing circuit 44 in order to execute a parallel-still-image recording process, and also applies a still-image recording command to the I/F 50. The post-processing circuit 44 outputs one frame of image data representing an object scene image at a time point when the shutter button 38s is manipulated, from a still-image output terminal S_OUT. The outputted image data is written into the still image area 42b of the SDRAM 42 through the memory control circuit 40. The I/F 50 reads out the image data accommodated in the still image area 42c through the memory control circuit 40, and creates a still image file in which the read-out image data is contained, within the recording medium 52.

On the other hand, when the shutter button 38s is manipulated in a state where the moving-image recording process is interrupted, in order to execute an independent still-image recording process, the CPU 36 sets the RAW zoom magnification and the YUV zoom magnification (both indicating "1.0") to the zoom circuits 24z and 44z, and applies the still-image processing command and the still-image recording command to the pre-processing circuit 24, the post-processing circuit 44, and the I/F 50, respectively.

Thereby, one frame of raw image data having a resolution of horizontal 3072 pixels×vertical 1728 pixels is outputted from the pre-processing circuit 24, and written into the raw image area 42a of the SDRAM 42.

The post-processing circuit 44 reads out the raw image data having the same resolution from the raw image area 42a, and outputs YUV-formatted image data that is based on the read-out raw image data from the still-image output terminal S_OUT. The outputted image data is written into the still image area 42c of the SDRAM 42 through the memory control circuit 40.

The I/F 50 reads out the image data accommodated in the still image area 42c through the memory control circuit 40, and creates a still image file in which the read-out image data is contained, within the recording medium 52. Upon completion of recording, the above-mentioned through-image process is resumed.

Figure 3:
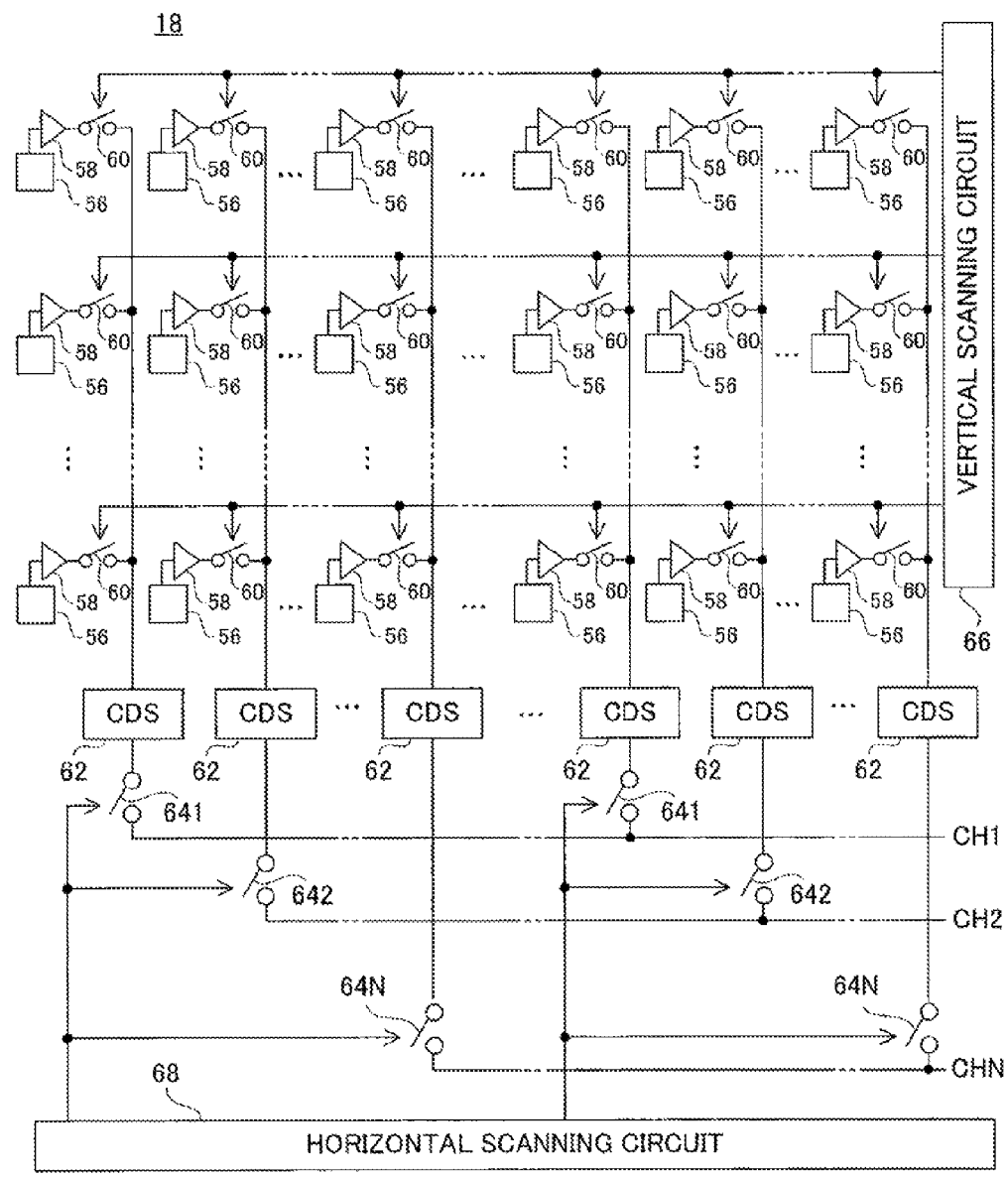
FIG. 3 is a block diagram showing one example of a configuration of an image sensor applied to the embodiment in FIG. 1.

The image sensor 18 is configured as shown in FIG. 3. The electric charges representing the object scene image are produced by a plurality of light-receiving elements 56, 56, . . . , placed in a matrix. Each light-receiving element 56 is equivalent to the above-described pixel. Each of light-receiving elements 56, 56, . . . , lined up in a vertical direction is connected to a common CDS circuit 62 via an A/D converter 58 and a row selecting switch 60. The electric charge produced in each light-receiving element 56 is converted into 12-bit digital data by the A/D converter 58. A vertical scanning circuit 66 executes an operation for turning on/off each of the row selecting switches 60, 60, . . . , for each pixel, in a raster scanning manner. Noise included in the pixel data that has undergone the row selecting switch 60 that is in a turned-on state is removed by the CDS circuit 62.

A column selecting switch 641 is allocated to the CDS circuit 62 in an (N*M+1)th column (M: 0, 1, 2, 3, . . . ), and a column selecting switch 642 is allocated to the CDS circuit 62 in an (N*M+2)th column. Similarly, a column selecting switch 64N is allocated to the CDS circuit 62 in an (N*M+N)th column.

A horizontal scanning circuit 68 turns on the column selecting switch 641 at a timing at which the row selecting switch 60 in the (N*M+1)th column is turned on, and turns on the column selecting switch 642 at a timing at which the row selecting switch 60 in the (N*M+2)th column is turned on. Likewise, the horizontal scanning circuit 68 turns on the column selecting switch 64N at a timing at which the row selecting switch 60 in the (N*M+N)th column is turned on.

As a result, partial raw image data based on the electric charge produced in the light-receiving element 56 in the (N*M+1)th column is outputted from the channel CH1, and partial raw image data based on the electric charge produced in the light-receiving element 56 in the (N*M+2)th column is outputted from the channel CH2. Partial raw image data based on the electric charge produced in the light-receiving element 56 in the (N*M+N)th column is outputted from the channel CHN.

Figure 4:
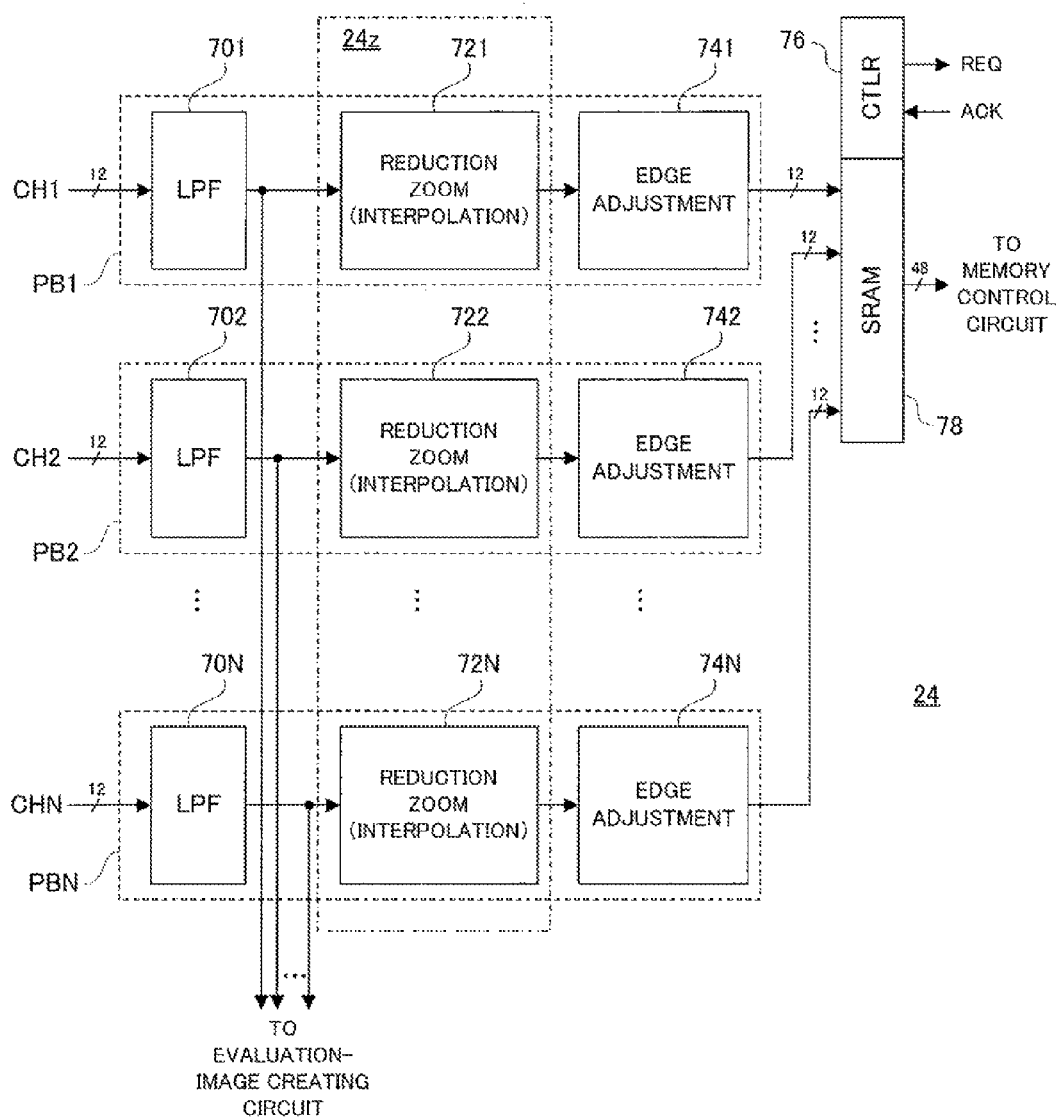
FIG. 4 is a block diagram showing one example of a configuration of a pre-processing circuit applied to the embodiment in FIG. 1.

The pre-processing circuit 24 is configured as shown in FIG. 4. The partial raw mage data of the channel CH1 is applied to a pre-processing block PB1, and the partial raw image data of the channel CH2 is applied to a pre-processing block PB2. The partial raw mage data of the channel CHN is applied to the pre-processing block PBN.

The pre-processing block PB1 is configured by an LPF 701, a reduction zoom circuit 721, and an edge adjusting circuit 741. The pre-processing block PB2 is configured by an LPF 702, a reduction zoom circuit 722, and an edge adjusting circuit 742. The pre-processing block PBN is configured by an LPF 70N, a reduction zoom circuit 72N, and an edge adjusting circuit 74N. It is noted that by the reduction zoom circuits 721 to 72N, the zoom circuit 24z shown in FIG. 1 is configured.

Therefore, the partial raw image data of each channel is subjected to a series of processes of a noise removal, a reduction zoom, and an edge adjustment, in parallel to one another. The partial raw image data from which the noise is removed is outputted toward the evaluation-image creating circuits 26 and 28, while the partial raw image data on which the edge adjustment is performed is written into an SRAM 78. A controller 76 issues a write request toward the memory control circuit 40 each time an amount of data accommodated in the SRAM 78 reaches a threshold value, and outputs the raw image data of a predetermined amount toward the memory control circuit 40 when an acknowledgment signal is sent back from an issuance destination.

A process for setting a zoom magnification in response to the manipulation of the zoom button 38z and a process for setting the motion detection areas MD1 to MD9, the focus area FA, and the photometric/white balance area EWA with reference to the RAW zoom magnification are executed in a manner described below. When the target display magnification is set, with reference to a graph shown in FIG. 5, the optical zoom magnification, the RAW zoom magnification, and the YUV zoom magnification are calculated. It is noted that data equivalent to values in the graph shown in FIG. 5 are saved in a flash memory 54 as graph data GRD.

Figure 5:
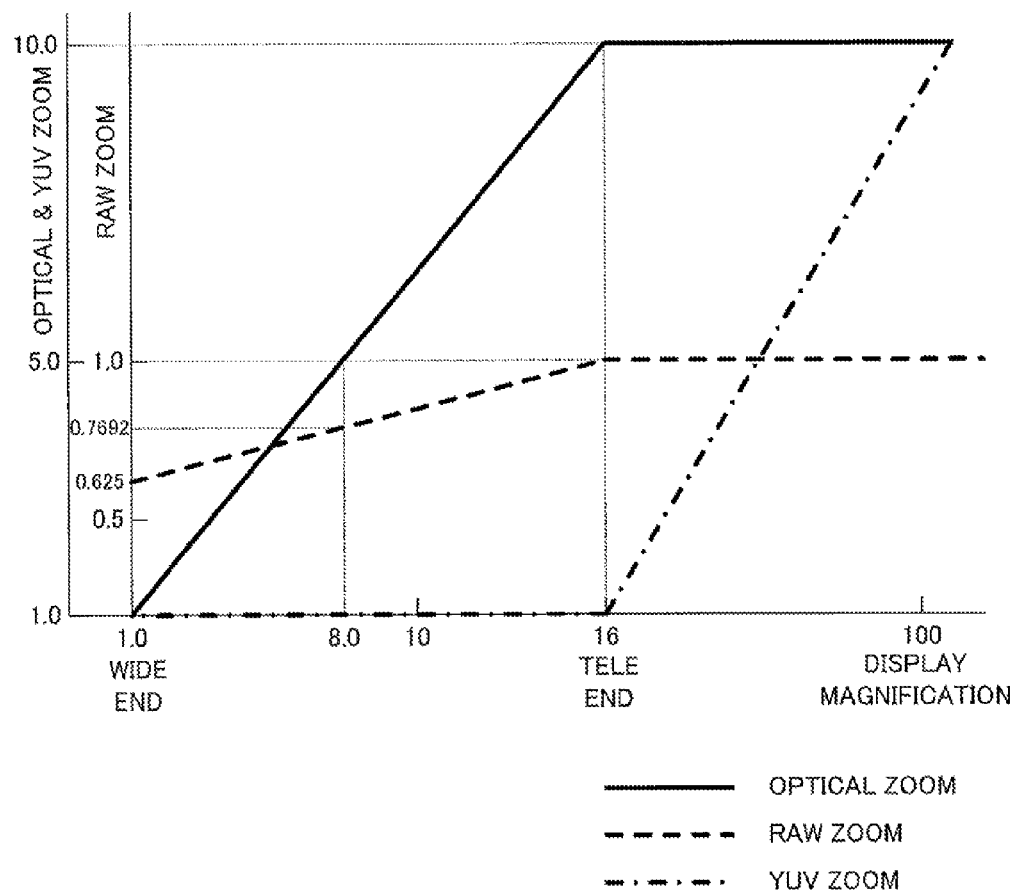
FIG. 5 is a graph showing one example of a relationship between a setting magnification for a zoom process and a magnification of a displayed image.

According to FIG. 5, the optical zoom magnification indicates "1.0" when the zoom lens 12 is positioned at a wide end, and indicates "10.0" when the zoom lens 12 is positioned at a tele end. Furthermore, the optical zoom magnification increases linearly as the zoom lens 12 moves from the wide end to the tele end, and is maintained at "10.0" in a range that the display magnification exceeds "16". The YUV zoom magnification is maintained at "1.0" in a range that the display magnification is equal to or less than "16", and increases linearly up to "10.0" in a range that the display magnification exceeds "16".

The RAW zoom magnification indicates "0.625" corresponding to the display magnification=1.0 (zoom lens 12=wide end), and indicates "1.0" corresponding to the display magnification=16 (zoom lens 12=tele end). Furthermore, the RAW zoom magnification increases linearly as the display magnification moves from "1.0" toward "16", and is maintained at "1.0" in a range that the display magnification exceeds "16".

When the target display magnification is set to "1.0", "1.0" is calculated as the optical zoom magnification, "0.625" is calculated as the RAW zoom magnification, and "1.0" is calculated as the YUV zoom magnification. Furthermore, when the target display magnification is set to "8.0", "5.0" is calculated as the optical zoom magnification, "0.7692" is calculated as the RAW zoom magnification, and "1.0" is calculated as the YUV zoom magnification. Moreover, when the target display magnification is set to "16", "10.0" is calculated as the optical zoom magnification, "1.0" is calculated as the RAW zoom magnification, and "1.0" is calculated as the YUV zoom magnification.

The optical zoom magnification, the RAW zoom magnification, and the YUV zoom magnification that are thus calculated are set to the driver 20a, the zoom circuit 24z, and the zoom circuit 44; respectively. Furthermore, the motion detection areas MD1 to MD9, the focus area FA, and the photometric/white balance area EWA are allocated to the imaging surface in a manner different depending on a magnitude of the set RAW zoom magnification.

Figure 6:
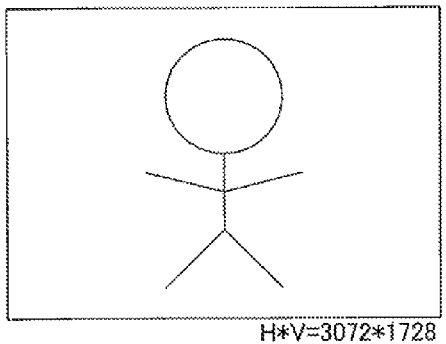
FIG. 6(A) is an illustrative view showing one example of an image outputted from an image sensor.
FIG. 6(B) is an illustrative view showing one example of an image outputted from a pre-processing circuit.
FIG. 6(C) is an illustrative view showing one example of a resolution of an EIS/AF evaluation image.
FIG. 6(D) is an illustrative view showing one example of a resolution of an AE/AWB evaluation image.
Figure 6:
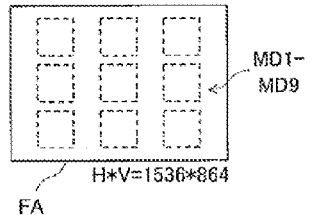
Figure 6:
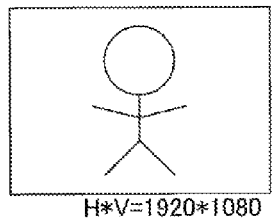
Figure 6:
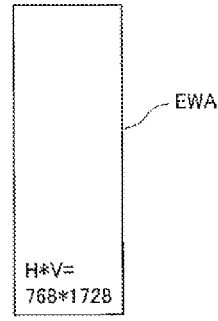

When the raw image data shown in FIG. 6(A) is outputted from the image sensor 18 corresponding to the optical zoom magnification "1.0", raw image data reduced as shown in FIG. 6(B) is outputted from the pre-processing circuit 24. A size of the reduced raw image data is the same as that of the extraction area EX (=horizontal 1920 pixels×vertical 1080 pixels), and thus, all the reduced raw image data are subject to be processed by the post-processing circuit 24. The YUV zoom magnification is "1.0", and thus, a through image having an angle of view shown in FIG. 6(B) is displayed on the LCD monitor 48.

Furthermore, as shown in FIG. 6(C), the focus area FA is allocated over the entire region of the EIS/AF evaluation image, and the motion detection areas MD1 to MD9 are allocated on the EIS/AF evaluation image so as to establish a predetermined relationship with the focus areas FA. Moreover, as shown in FIG. 6(D), the photometric/white balance area EWA is allocated over the entire area of the AE/AWB evaluation image.

Figure 7:
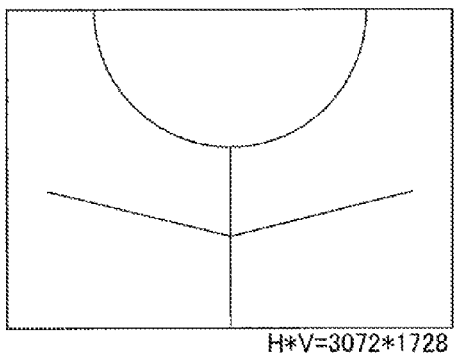
FIG. 7(A) is an illustrative view showing another example of an image outputted from an image sensor.
FIG. 7(B) is an illustrative view showing another example of an image outputted from the pre-processing circuit.
FIG. 7(C) is an illustrative view showing another example of a resolution of an EIS/AF evaluation image.
FIG. 7(D) is an illustrative view showing another example of a resolution of an AE/AWB evaluation image.
Figure 7:
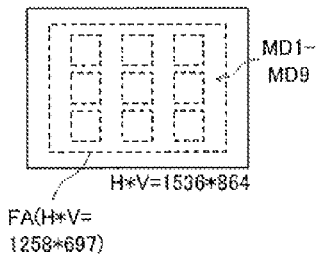
Figure 7:
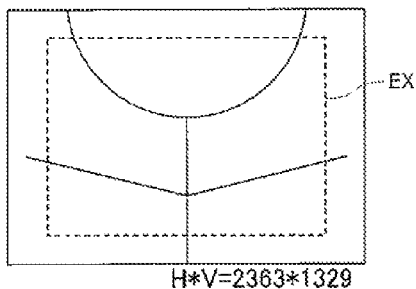
Figure 7:
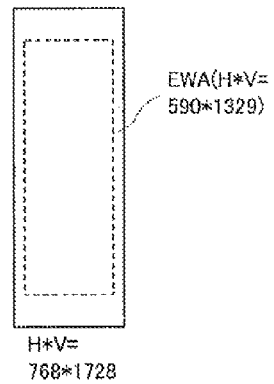

When the optical zoom magnification is changed to "5.0", raw image data shown in FIG. 7(A) is outputted from the image sensor 18. Because the RAW zoom magnification is changed to "0.7692", raw image data having a size as shown in FIG. 7(B) (horizontal 2363 pixels×vertical 1329 pixels) is outputted from the pre-processing circuit 24. The post-processing circuit 44 performs a post-process on one portion of raw image data belonging to the extraction area EX, out of the raw image data shown in FIG. 7(B). The YUV zoom magnification is "1.0", and as a result a through image of an angle of view equivalent to the extraction area EX shown in FIG. 7 (B) is displayed on the LCD monitor 48.

Furthermore, with reference to FIG. 7(C), a focus area FA having a size equivalent to horizontal 1258 pixels×vertical 697 pixels is allocated in a center of the EIS/AF evaluation image. The motion detection areas MD1 to MD9 are allocated on the EIS/AF evaluation image so as to establish a predetermined relationship with such a focus areas FA. Furthermore, with reference to FIG. 7(D), the photometric/white balance area EWA, which has horizontal 590 pixels×vertical 1329 pixels, is allocated on the AE/AWB evaluation image.

Figure 8:
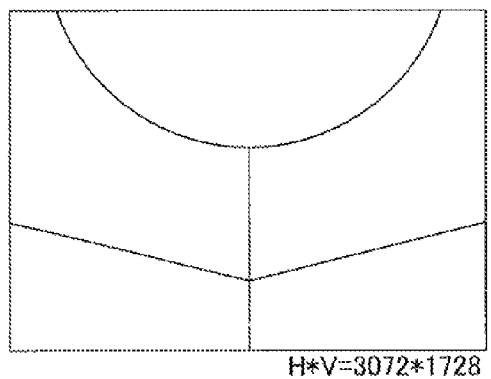
FIG. 8(A) is an illustrative view showing another example of an image outputted from an image sensor.
FIG. 8(B) is an illustrative view showing another example of an image outputted from the pre-processing circuit.
FIG. 8(C) is an illustrative view showing another example of a resolution of an EIS/AF evaluation image.
FIG. 8(D) is an illustrative view showing another example of a resolution of an AE/AWB evaluation image.
Figure 8:
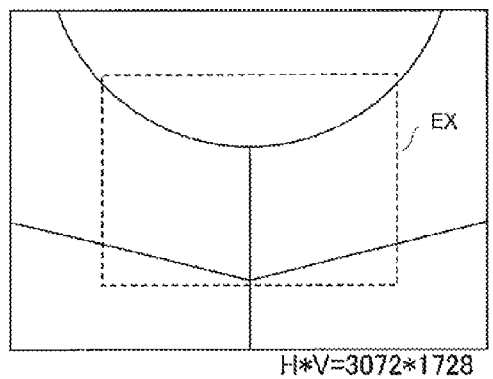
Figure 8:
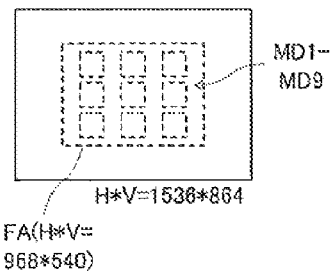
Figure 8:
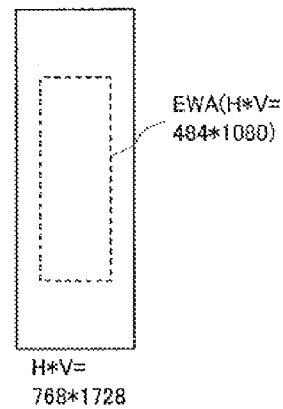

When the optical zoom magnification is changed to "10.0", raw image data shown in FIG. 8(A) is outputted from the image sensor 18. The RAW zoom magnification is changed to "1.0", and raw image data having a size as shown in FIG. 8(B) (horizontal 3096 pixels×vertical 1728 pixels) is outputted from the pre-processing circuit 24. The post-processing circuit 44 performs a post-process on one portion of raw image data belonging to the extraction area EX, out of the raw image data shown in FIG. 8(B). The YUV zoom magnification is "1.0", and as a result, a through image of an angle of view equivalent to the extraction area EX shown in FIG. 8(B) is displayed on the LCD monitor 48.

With reference to FIG. 8(C), a focus area FA having a size equivalent to horizontal 968 pixels×vertical 540 pixels is allocated in a center of the EIS/AF evaluation image. The motion detection areas MD1 to MD9 are allocated on the EIS/AF evaluation image so as to establish a predetermined relationship with such a focus areas FA. Furthermore, with reference to FIG. 8(D), the photometric/white balance area EWA, which has horizontal 484 pixels×vertical 1080 pixels, is allocated on the AE/AWB evaluation image.

Thus, the RAW zoom magnification increases as the optical zoom magnification increases, and decreases as the optical zoom magnification decreases. Therefore, the angle of view of the object scene image based on the raw image data extracted by the post-processing circuit 44 decreases by a rate exceeding a decrease rate resulting from the increase in optical zoom magnification, and increases by a rate exceeding an increase rate resulting from the decrease in optical zoom magnification. As a result, in a low zoom magnification range, it is possible to secure a wide angle of view irrespective of the increase in resolution of the imaging surface. Also, in a high zoom magnification range, a zoom effect increases. Thus, the performance of reproducing the object scene image improves.

Figure 9:
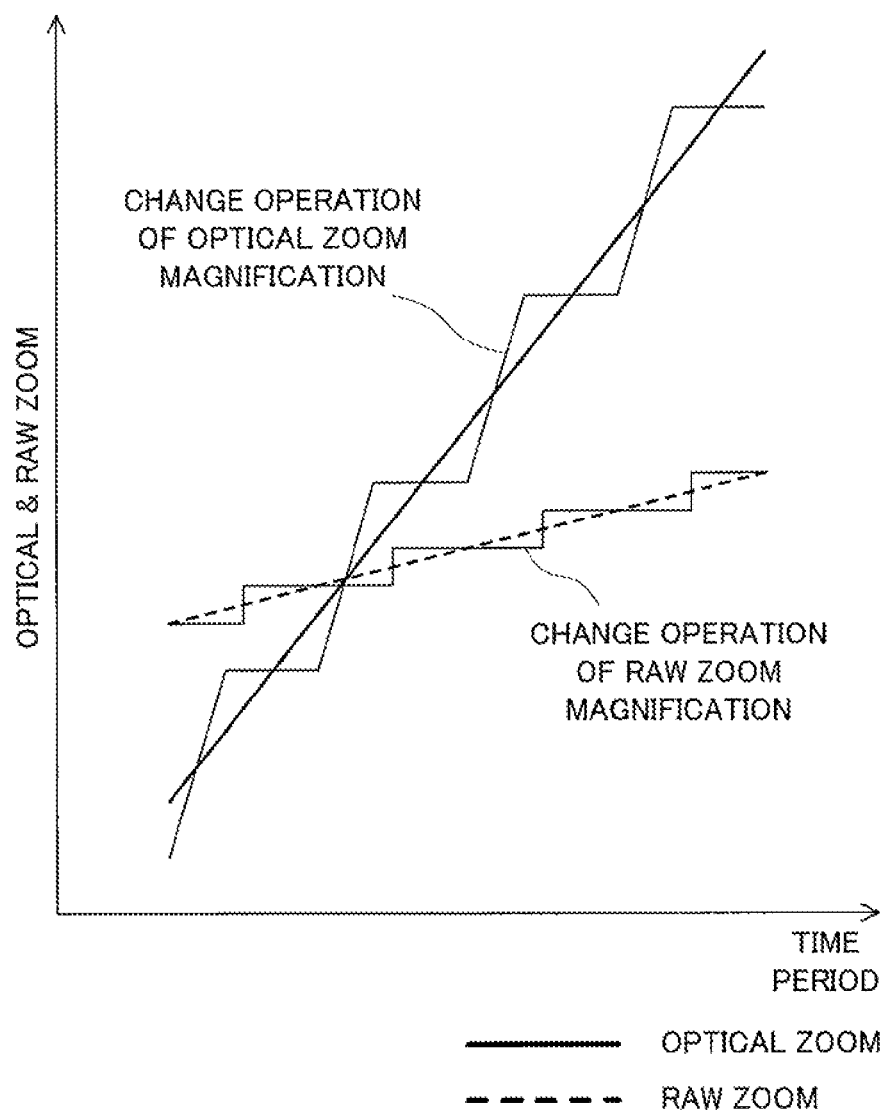
FIG. 9 is a timing chart showing one example of a change operation of an optical zoom magnification and a RAW zoom magnification.

It is noted that when the display magnification is adjusted in a range of "1.0" to "16", the optical zoom magnification and the RAW zoom magnification are changed. Strictly speaking, the optical zoom magnification and the RAW zoom magnification are alternately changed as shown in FIG. 9. According to FIG. 9, the RAW zoom magnification is fixed in a changing period of the optical zoom magnification, i.e., a moving period of the zoom lens 12, and is changed in a stopping period of the zoom lens 12. As a result, a smooth zoom process is realized.

Figure 10:
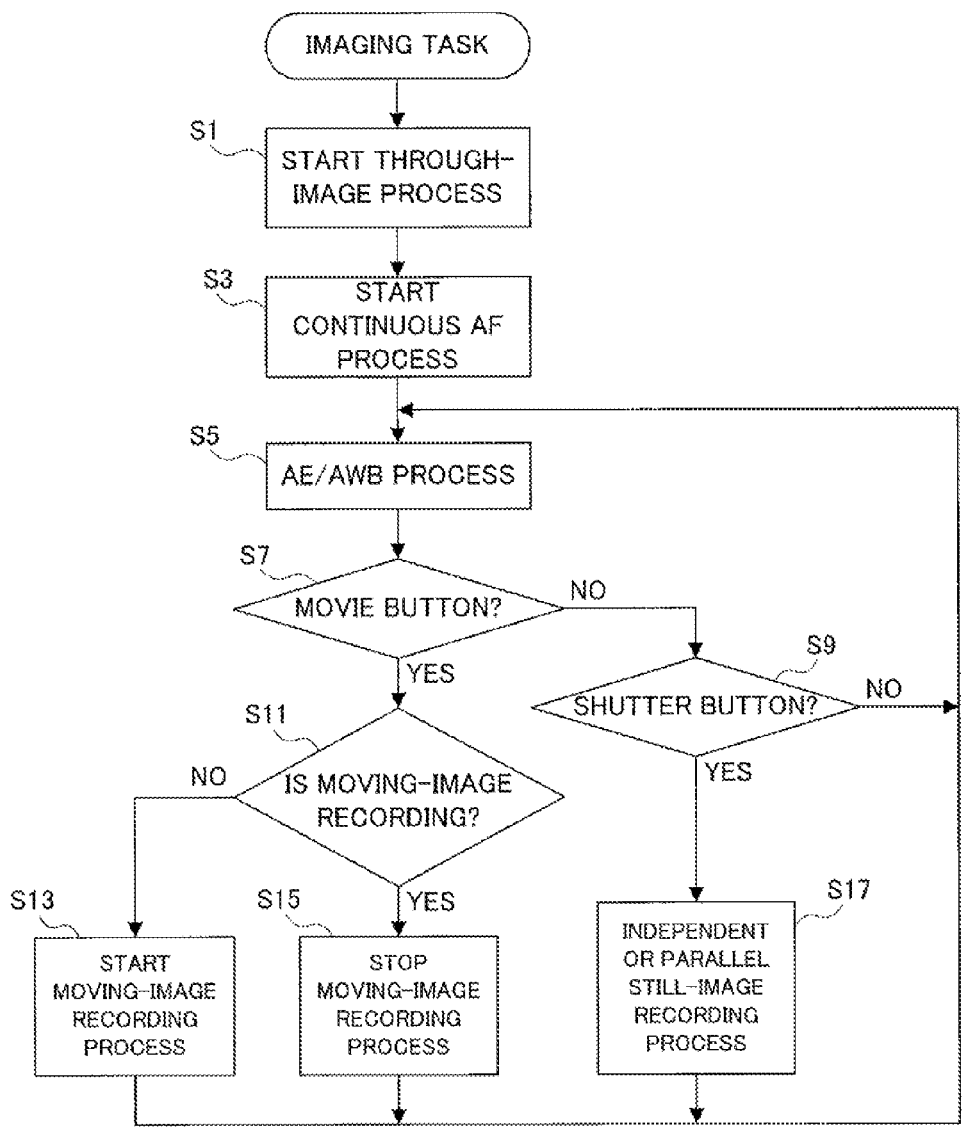
FIG. 10 is a flowchart showing one portion of an operation of a CPU applied to the embodiment in FIG. 1.
Figure 11:
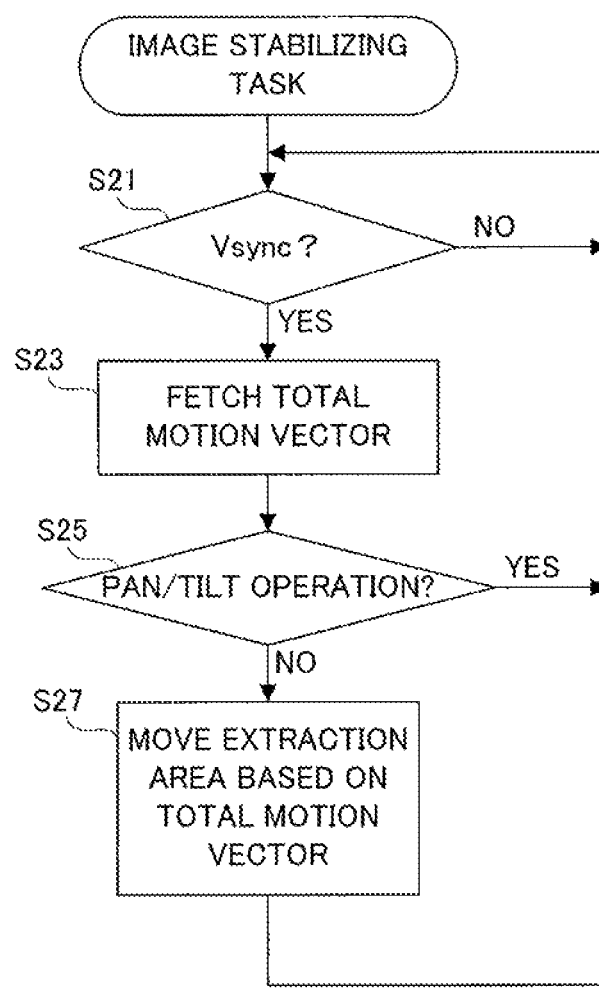
FIG. 11 is a flowchart showing another portion of the operation of the CPU applied to the embodiment in FIG. 1.
Figure 12:
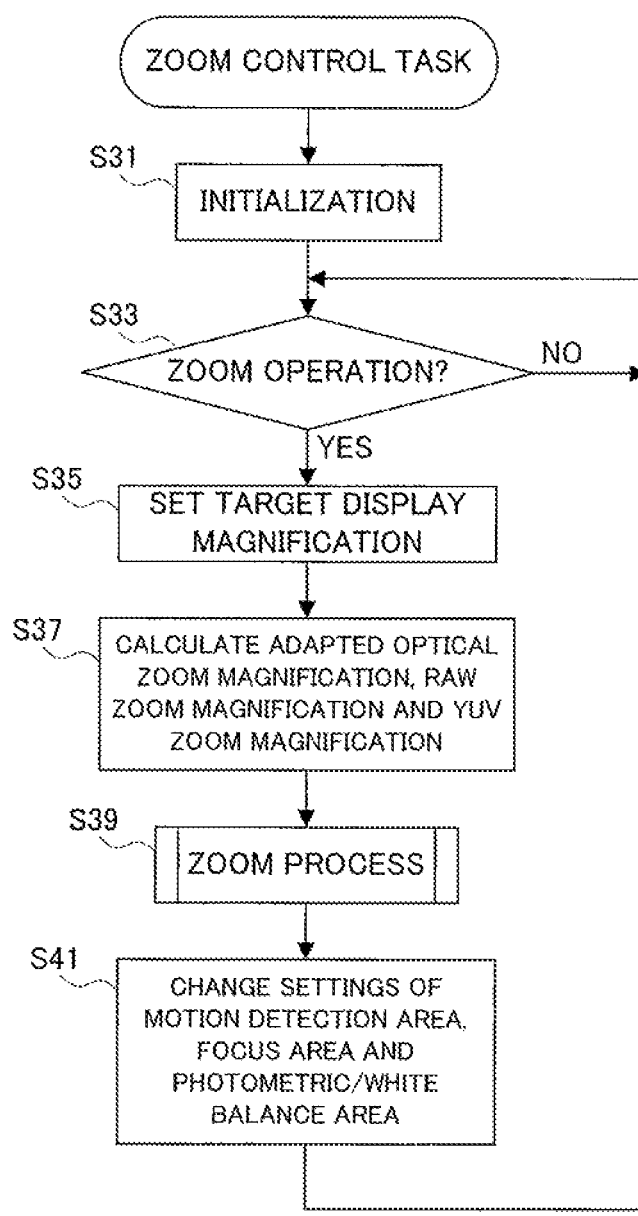
FIG. 12 is a flowchart showing still another portion of the operation of the CPU applied to the embodiment in FIG. 1.
Figure 13:
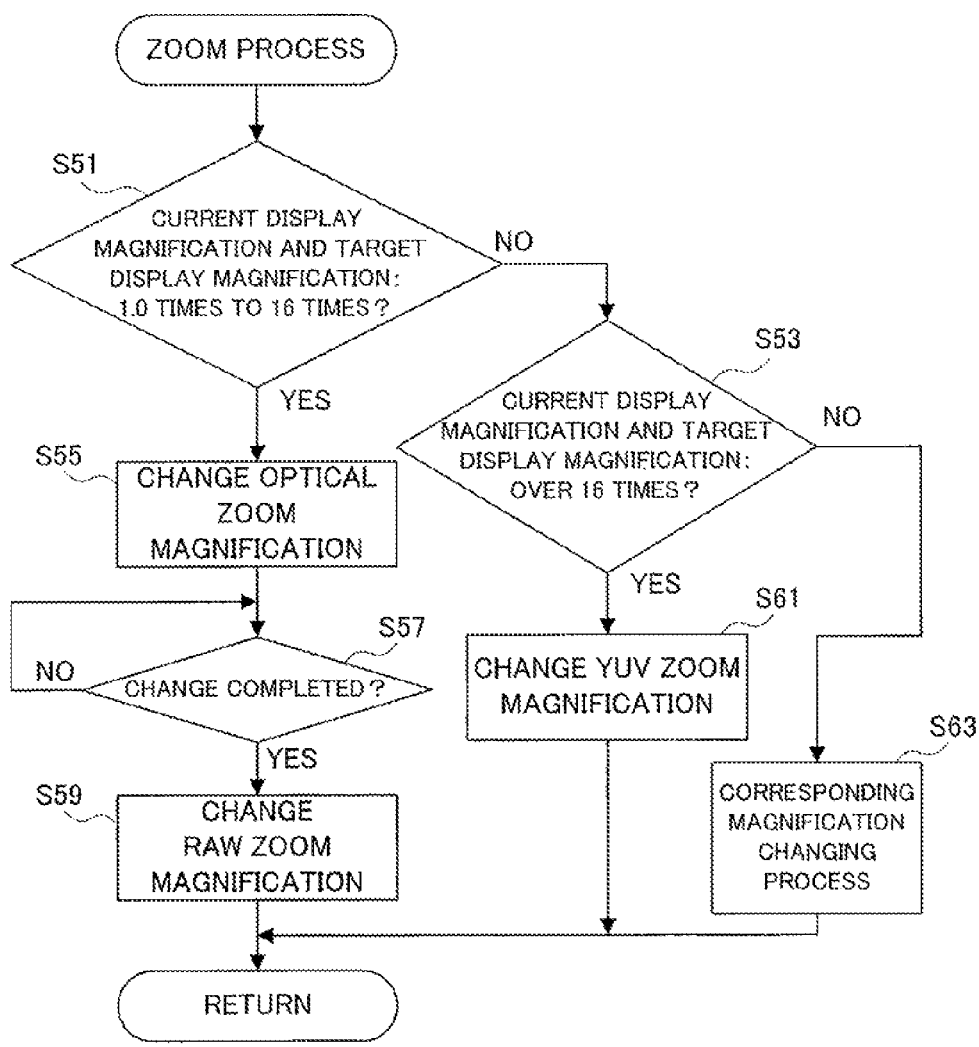
FIG. 13 is a flowchart showing yet still another portion of the operation of the CPU applied to the embodiment in FIG. 1.

The CPU 36 executes in parallel a plurality of tasks including an imaging task shown in FIG. 10, an image-stabilizing task shown in FIG. 11, and a zoom control task shown in FIG. 12 and FIG. 13. It is noted that control programs corresponding to these tasks are stored in the flash memory 54.

With reference to FIG. 10, a through-image process is started in a step S1, and a continuous AF process is started in a step S3. As a result of the process in the step S1, raw image data having a resolution of horizontal 3096 pixels×vertical 1920 pixels is outputted from the image sensor 18 at every 1/30 seconds, and a through image based on this raw image data is outputted from the LCD monitor 48. Also, as a result of the process in the step S3, the position of the focus lens 14 is adjusted continually.

In a step S5, the AE/AWB process is executed. As a result, a brightness and a white balance of the through image are adjusted moderately. In a step S7, it is determined whether or not the movie button 38*m* is manipulated, and in a step S9, it is determined whether or not the shutter button 38*s* is manipulated.

When the movie button 38*m* is manipulated, the process advances to a step S11 from the step S7 so as to determine whether or not the moving-image recording process is being executed. When NO is determined in this step, the moving-image recording process is started in a step S13, and on the other hand, when YES is determined, the moving-image recording process is stopped in a step S15. Upon completion of the process in the step S13 or S15, the process returns to the step S5. When the shutter button 38*s* is manipulated, the independent still-image recording process or the parallel still-image recording process is executed in a step S17, and thereafter, the process returns to the step S5.

With reference to FIG. 11, in a step S21, whether or not the vertical synchronization signal Vsync is generated is determined. When the determination result is updated from NO to YES, the process advances to a step S23 so as to fetch the total motion vector produced by the motion detecting circuit 30. In a step S25, it is determined whether or not the motion of the imaging surface in a direction orthogonal to an optical axis is equivalent to the pan/tilt. When YES is determined, the process directly returns to a step S31 while NO is determined, the process returns to the step S21 after undergoing the process in a step S27. In the step S27, based on the total motion vector fetched in the step S23, the position of the extraction area EX is so changed that the motion of the imaging surface in an optical-axis direction is compensated (offset).

With reference to FIG. 12, zoom settings are initialized in the step S31, and in a step S33, it is determined whether or not the zoom button 38*z* is manipulated. When a determination result is updated from NO to YES, the process advances to a step S35 so as to set, as the target display magnification, the display magnification different depending on each manipulation manner of the zoom button 38*z*. In a step S37, with reference to the graph shown in FIG. 5, the optical zoom magnification, the RAW zoom magnification, and the YUV zoom magnification, each of which corresponds to the target display magnification, are calculated.

In a step S39, in order to execute the zoom process, the calculated optical zoom magnification, RAW zoom magnification, and YUV zoom magnification are set to the driver 20*a*, the zoom circuit 24*z*, and the zoom circuit 44*z*, respectively. Thereby, the through image having the target display magnification is outputted from the LCD monitor 48.

In a step S41, settings of the motion detection areas MD1 to MD9, the focus area FA, and the photometric/white balance area EWA are changed in order to enable adaptation to the RAW zoom magnification set in a step S49. As a result, the image-stabilizing process, the continuous AF process, and the AE/AWB process are executed highly accurately. Upon completion of the process in the step S41, the process returns to the step S33.

The zoom process in the step S39 is executed according to a sub-routine shown in FIG. 13. Firstly, it is determined in a step S51 whether or not both the current display magnification and the target display magnification are within a range of 1.0 time to 16 times, and then, it is determined in a step S53 whether or not both the current display magnification and the target display magnification are within a range exceeding 16 times.

When YES is determined in the step S51, the optical zoom magnification is changed in a step S55. Upon completion of the changing operation of the optical zoom magnification, YES is determined in a step S57, and the RAW zoom magnification is changed in a step S59. When YES is determined in the step S53, the YUV zoom magnification is changed in a step S61. When NO is determined in the step S53, i.e., it is regarded that both the current display magnification and the target zoom magnification are over 16 times, a corresponding magnification changing process is executed in a step S63. Upon completion of the process in the steps S59 to S63, the process is restored to a routine at a hierarchical upper level.

As can be seen from the above description, the image sensor 18 has the imaging surface capturing the object scene through the zoom lens 12, and outputs the image representing the object scene. The image outputted from the image sensor 18 is reduced in size by the zoom circuit 24*z* arranged in the pre-processing circuit 24. The post-processing circuit 44 extracts the reduced image belonging to the extraction area of a predetermined size, out of the reduced image created by the pre-processing circuit 24. Depending on the change of the magnification of the zoom lens 12, the CPU 36 changes the size of the reduced image created by the pre-processing circuit 24 in the same direction as the change direction of the magnification of the zoom lens 12.

Therefore, the angle of view of the reduced image extracted by the post-processing circuit 44 decreases by a rate exceeding a decrease rate resulting from the increase in optical zoom magnification, and increases by a rate exceeding an increase rate resulting from the decrease in optical zoom magnification. As a result, in a low zoom magnification range, it is possible to secure a wide angle of view irrespective of the increase in resolution of the imaging surface. Also, in a high zoom magnification range, a zoom effect increases. Thus, the performance of reproducing the object scene image improves.

Figure 14:
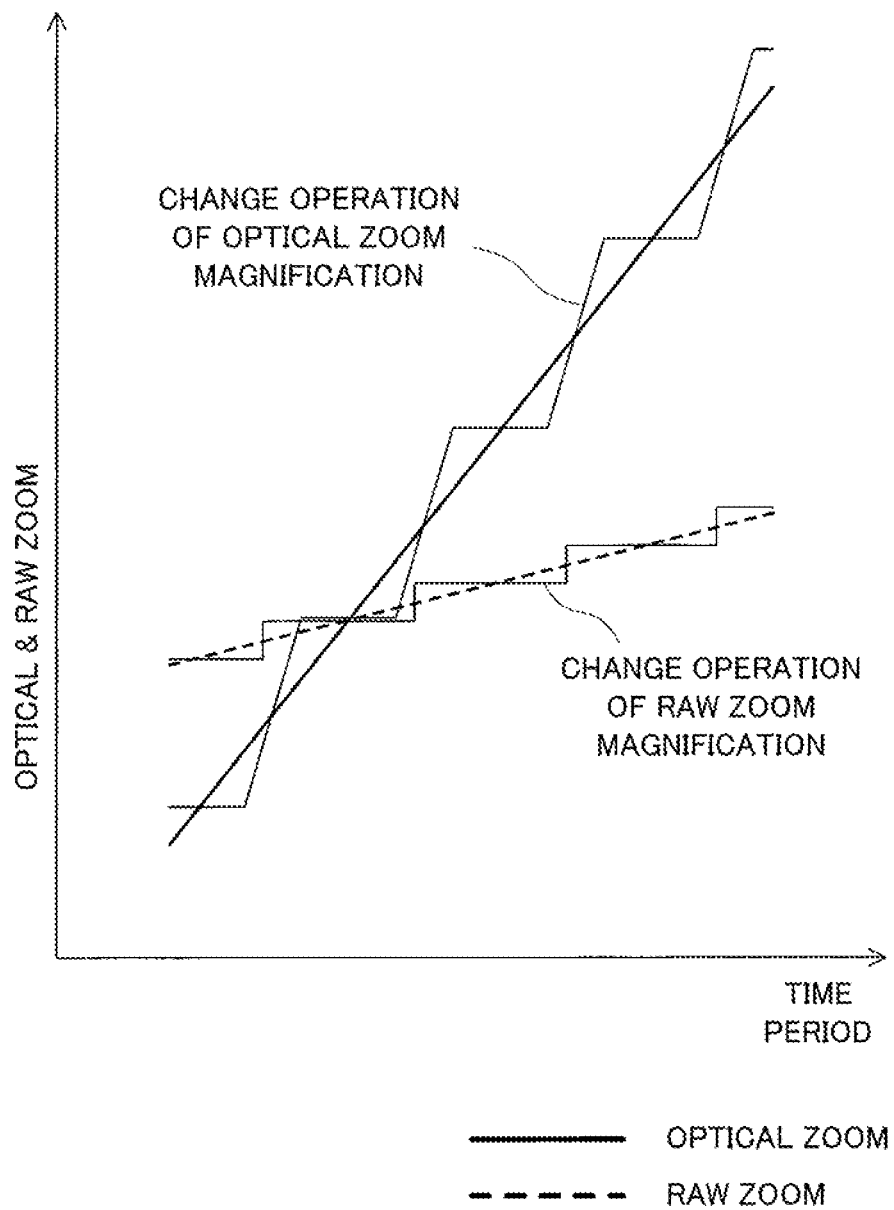
FIG. 14 is a timing chart showing one example of a change operation of an optical zoom magnification and a RAW zoom magnification.
Figure 15:
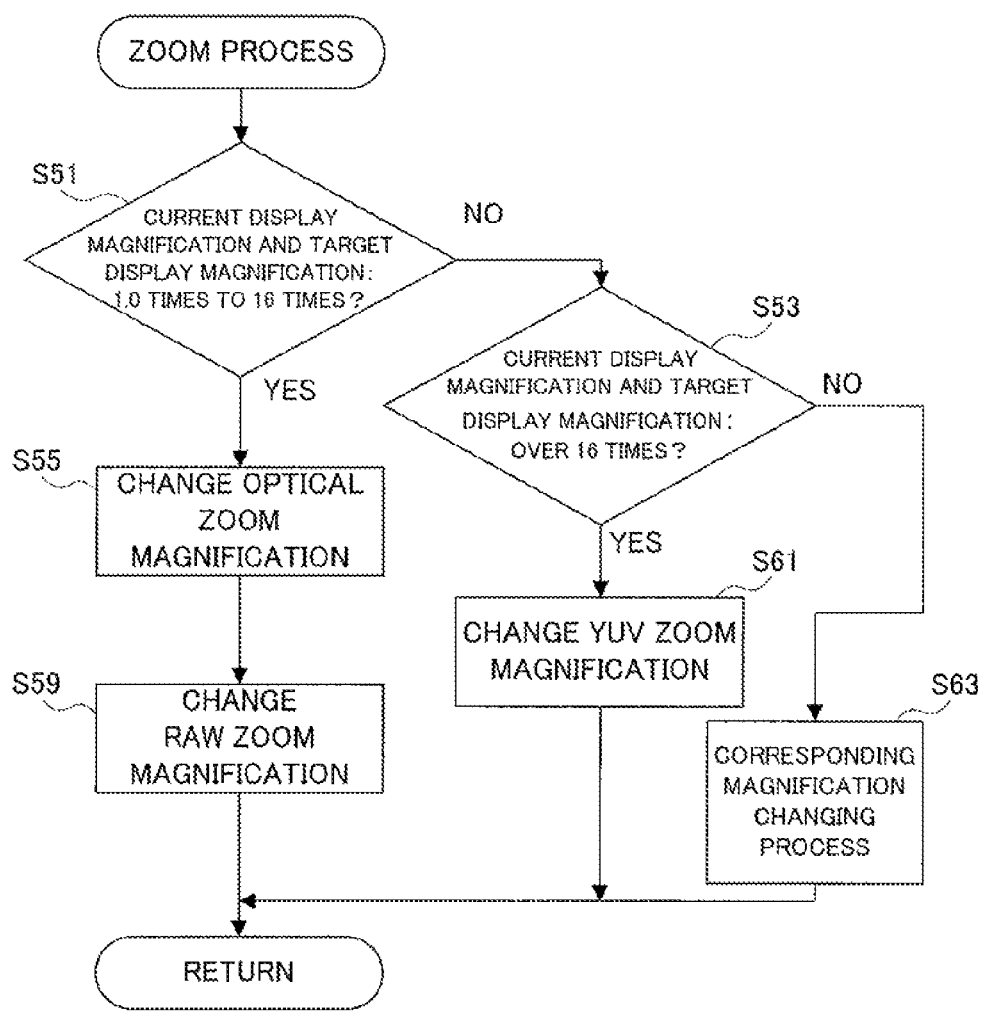
FIG. 15 is a flowchart showing one portion of the operation of the CPU corresponding to the timing chart shown in FIG. 14.

It is noted that in this embodiment, when the display magnification is adjusted in a range of "1.0" to "16", the optical zoom magnification and the RAW zoom magnification are alternately changed (see FIG. 9). However, the optical zoom magnification and the RAW zoom magnification may be optionally changed simultaneously as shown in FIG. 14. Corresponding to such a zoom process, the CPU 36 executes a sub routine shown in FIG. 15 instead of the sub routine shown in FIG. 13. The difference from the sub routine shown in FIG. 13 is that the process in the step S57 is omitted in FIG. 15. This enables inhibition of an amount of consumption of electric power.

Moreover, in this embodiment, upon executing the zoom process, the graph shown in FIG. 5 is referred to. However, instead thereof, a graph shown in FIG. 16 or a graph shown in FIG. 17 may be optionally referred to.

Figure 16:
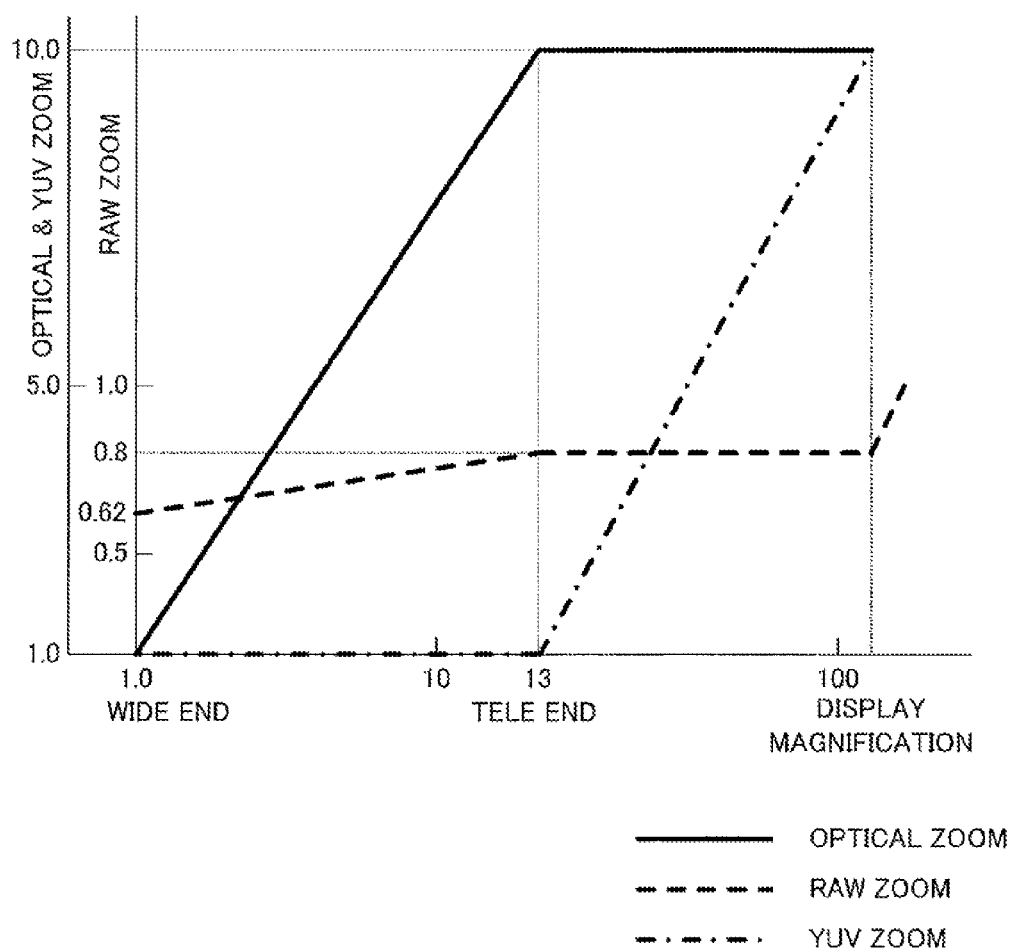
FIG. 16 is a graph showing another example of the relationship between the setting magnification for a zoom process and the magnification of a displayed image.

According to FIG. 16, the optical zoom magnification indicates "1.0" when the zoom lens 12 is positioned at a wide end, and indicates "10.0" when the zoom lens 12 is positioned at a tele end. Furthermore, the optical zoom magnification increases linearly as the zoom lens 12 moves from the wide end to the tele end, and is maintained at "10.0" in a range that the display magnification exceeds "13". The YUV zoom magnification is maintained at "1.0" in a range that the display magnification is equal to or less than "13", and increases linearly up to "10.0" in a range that the display magnification exceeds "13".

The RAW zoom magnification indicates "0.62" corresponding to the display magnification=1.0 (zoom lens 12=wide end), and indicates "0.8" corresponding to the display magnification=13 (zoom lens 12=tele end). Furthermore, the RAW zoom magnification increases linearly as the display magnification moves from "1.0" toward "13", is maintained at "0.8" in a range that the YUV zoom magnification increases, and increases linearly up to "1.0" in a range after the YUV zoom magnification reaches "10.0".

Figure 17:
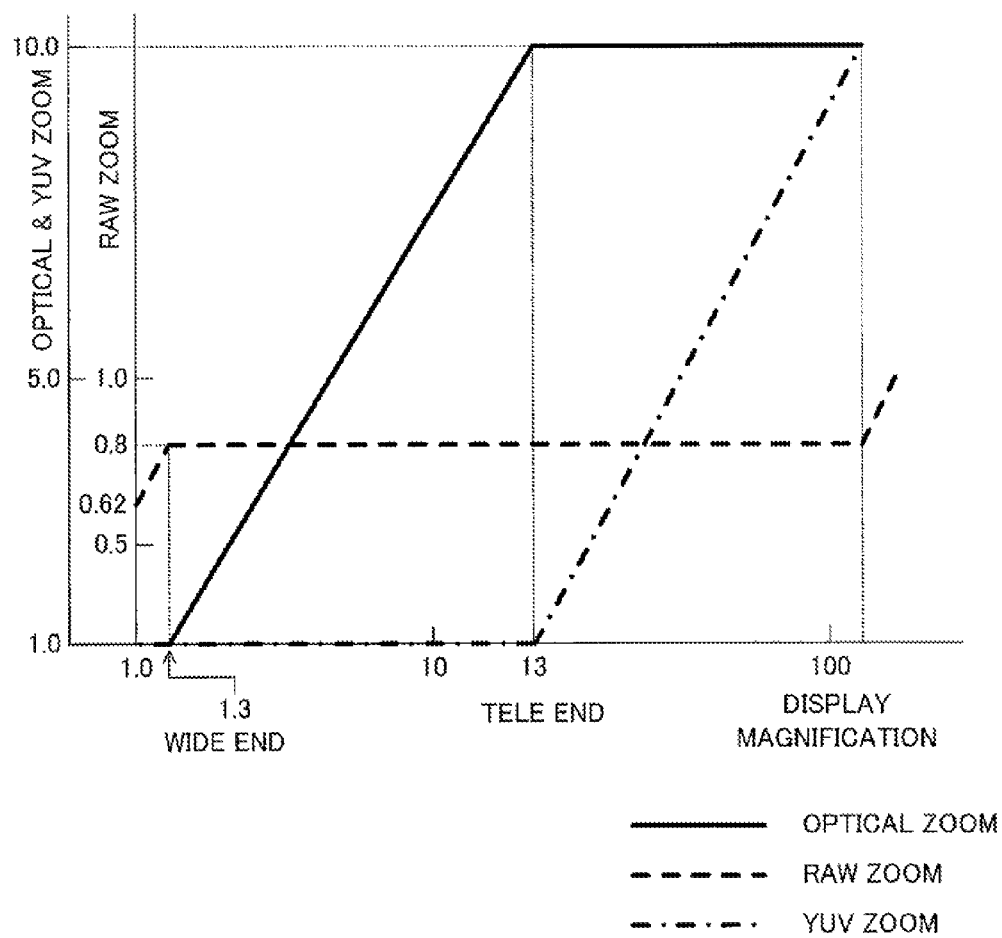
FIG. 17 is a graph showing still another example of the relationship between the setting magnification for a zoom process and the magnification of a displayed image.

According to FIG. 17, the optical zoom magnification indicates "1.0" when the zoom lens 12 is positioned at a wide end, and indicates "10.0" when the zoom lens 12 is positioned at a tele end. Furthermore, the optical zoom magnification increases linearly as the zoom lens 12 moves from the wide end to the tele end, and is maintained at "10.0" in a range that the display magnification exceeds "13". The YUV zoom magnification is maintained at "1.0" in a range that the display magnification is equal to or less than "13", and increases linearly up to "10.0" in a range that the display magnification exceeds "13".

The RAW zoom magnification indicates "0.62" corresponding to the display magnification=1.0 and indicates "0.8" corresponding to the display magnification=1.3. Furthermore, the RAW zoom magnification increases linearly as the display magnification moves from "1.0" toward "1.3", is maintained at "0.8" in a range that the optical zoom magnification or the YUV zoom magnification increases, and increases linearly up to "1.0" in a range after the YUV zoom magnification reaches "10.0".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An electronic camera, comprising:
   an imager, having an imaging surface capturing an optical image through a zoom lens, which repeatedly outputs an electronic image corresponding to the optical image;
   a lens mover which moves said zoom lens between a wide end and a tele end in order to change a zoom magnification in parallel with an image outputting process of said imager;
   a reducer which reduces the number of pixels of the electronic image outputted from said imager so as to create a reduced image;
   an extractor which extracts a reduced image belonging to an extraction area of a predetermined size, out of the reduced image created by said reducer; and
   a controller which changes the number of pixels of the reduced image to be created by said reducer in a direction which is the same as a changing direction of the zoom magnification by said lens mover, wherein
   said controller sets the number of pixels of the reduced image to a first number and a second number respectively corresponding to the wide end and the tele end, and changes the number of pixels of the reduced image along a straight line that connects a first coordinate specified by the wide end and the first number and a second coordinate specified by the tele end and the second number on a graph represented by two coordinate axes respectively defining a position of said zoom lens and the number of pixels of the reduced image,
   wherein the first number is equivalent to the predetermined size.

2. An electronic camera according to claim 1, further comprising a changer which changes a position of the extraction area so that a motion of the imaging surface in a direction orthogonal to an optical axis is compensated.

3. An electronic camera according to claim 1, wherein the second number is equivalent to a maximum number of pixels.

4. An electronic camera according to claim 3, wherein the maximum number of pixels is equivalent to the number of pixels of the electronic image outputted from said imager.

5. An electronic camera according to claim 1, wherein the second number is equivalent to a number of pixels smaller than a maximum number of pixels.

6. An electronic camera according to claim 1, wherein said lens mover intermittently changes a position of said zoom lens, and said controller changes the number of pixels of the reduced image at an interval of a moving process of said lens mover.

7. An electronic camera according to claim 1, wherein said controller changes the number of pixels of the reduced image at the same time as a moving process of said lens mover.

8. An electronic camera according to claim 1, further comprising:
   a moving-image recorder which executes a moving-image recording process for recording, as a moving image, the electronic images outputted from said imager in response to a moving-image recording manipulation; and a still-image recorder which executes a still-image recording process for recording, as a still image, the electronic image outputted from said imager in response to a still-image-recording manipulation.

9. An electronic camera according to claim 1, further comprising an adjustor which adjusts an imaging parameter based on an electronic image having the number of pixels before being reduced by said reducer.

10. An electronic camera according to claim 1, wherein the electronic image outputted from said imager is equivalent to an image in which each pixel has color information of any one of a plurality of colors, said electronic camera further comprising a converter which converts the reduced image extracted by said extractor into an image in which each pixel has color information of all the plurality of colors.

11. An electronic camera, comprising:

an imager, having an imaging surface capturing an optical image through a zoom lens, which repeatedly outputs an electronic image corresponding to the optical image;

a lens mover which moves said zoom lens in order to change a zoom magnification in parallel with an image outputting process of said imager;

a reducer which reduces the number of pixels of the electronic image outputted from said imager so as to create a reduced image at a reduction ratio corresponding to the zoom magnification;

an extractor which extracts a reduced image belonging to an extraction area of a predetermined size, out of the reduced image created by said reducer; and a controller which changes the number of pixels of the reduced image to be created by said reducer in a direction which is the same as a changing direction of the zoom magnification by said lens mover, wherein said reducer continuously changes the reduction ratio in conjunction with a movement of said zoom lens throughout the entire moving range of said zoom lens, wherein the reduced image size, when the zoom lens is positioned at the wide angle end, is equal to the predetermined size.

* * * * *